Aug. 14, 1934.  C. S. BRAGG  1,969,775

BRAKE DRUM

Original Filed Jan. 31, 1931

Caleb S. Bragg INVENTOR
BY Louis Prevost Whitney
ATTORNEY

Patented Aug. 14, 1934

1,969,775

UNITED STATES PATENT OFFICE

1,969,775

BRAKE DRUM

Caleb S. Bragg, Palm Beach, Fla.

Original application January 31, 1931, Serial No. 505,821. Divided and this application June 7, 1932, Serial No. 615,787. Renewed January 5, 1934

3 Claims. (Cl. 188—218)

My invention consists in the novel features hereinafter described reference being had to the accompanying drawing which shows one embodiment of my invention, selected by me for purposes of illustration, and the said invention is fully disclosed in the following description and claims.

This application is a division of my former application for Letters Patent of the United States filed January 31, 1931 and given Serial Number 505,821.

My invention consists in a new friction element for use in brake mechanism or clutch mechanism for automotive vehicles, although it may be embodied in any other forms of friction apparatus for any purpose in which its use may be desirable. My invention is particularly advantageous in brake mechanism for automotive vehicles, and especially in the construction of brake drums therefor.

Brake drums formed of sheet steel, stamped or pressed by suitable dies into final form with hub apertures and bolt holes, are used practically on all automotive vehicles except the very heavy models, on account of their lightness and low cost of manufacture. In order to form these drums by stamping or pressing, it is necessary to use a comparatively soft steel, with the result that the braking flanges of the drums are easily scored by frictional engagement with the other braking element, which is usually the brake shoes in the internal expanding type of brake mechanism, or a brake band in the internal expanding type of brake mechanism, or a brake band in the external contracting type of brake mechanism, the former type being more usual as the latter type has been practically abandoned. It has been found that brake shoe pressures, which are otherwise practical distort the flange into an oval shape, and it has also been found that the frictional heat developed in braking, tends to distort the braking flange of the drum, and in both cases appreciably reduce the area of frictional contact between the drum flange and the opposed braking element, and increase the pressure on the remaining contact surfaces which may cause excessive wear, heat and scoring. It has been proposed to form an angular reinforcing lip at the outer edge of the braking flange, but this does not prevent distortion of the flange between the lip and the body or disc of the drum. It has also been proposed to provide the flange with an exterior L or U shaped reinforcing band. This adds to the cost of manufacture of the drum, and also adds to the weight and does not entirely prevent the distortion of portions of the braking flange adjacent to the reinforcing band.

My invention consists primarily in a pressed brake drum of steel or other suitable material in sheet or other form, having its annular braking flange stiffened to resist any change of form by braking pressure or heat of friction, by bending or distorting portions of the braking flange extending circularly and helically around the flange, to different distances from the axis of the drum, from other portions circularly and helically extending portions of the flange, thereby forming a series of corrugations extending circularly and helically around the flange, after the manner of a screw thread, it being understood that the flange is of substantially uniform thickness throughout and that projecting portions on one surface of the flange will correspond with indented portions on its other surface. The helical corrugations are preferably formed by bending portions of the flange alternately outwardly and inwardly, and preferably without materially thinning the flange, and these helical corrugations impart great strength and stiffness to the flange, and may be of any desired number or shape. The inner face of the braking flange is provided with a lining extending entirely around the same and having its outer face provided with helical corrugations corresponding with and fitting the corrugations in the inner face of the flange, while the inner face of the lining is cylindrical and coaxial with the axis of rotation of the drum. The lining is secured to the braking flange of the drum against movement relatively thereto and its inner surface is adapted to be engaged by the coacting brake elements, as the brake shoes of an internal expanding brake mechanism. The lining is preferably annular and formed in one piece, and is separate from the drum, so that it may be screwed into and out of the same, and the helical corrugations on the braking flange and lining are so disposed with reference to the direction of rotation of the drum, that any tendency toward relative rotary movement of the lining with respect to the drum due to the brake shoes, will be in a direction to screw the lining into the drum and against the attaching portions thereof. Rivets or other fastening means may be used for this purpose if desired.

Referring to the accompanying drawing.

Figure 1:
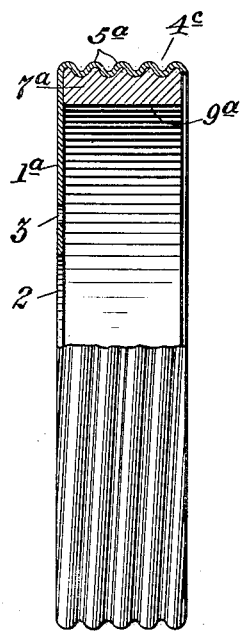
Fig. 1 is an elevation, partly in section, of the drum and lining.
Figure 2:
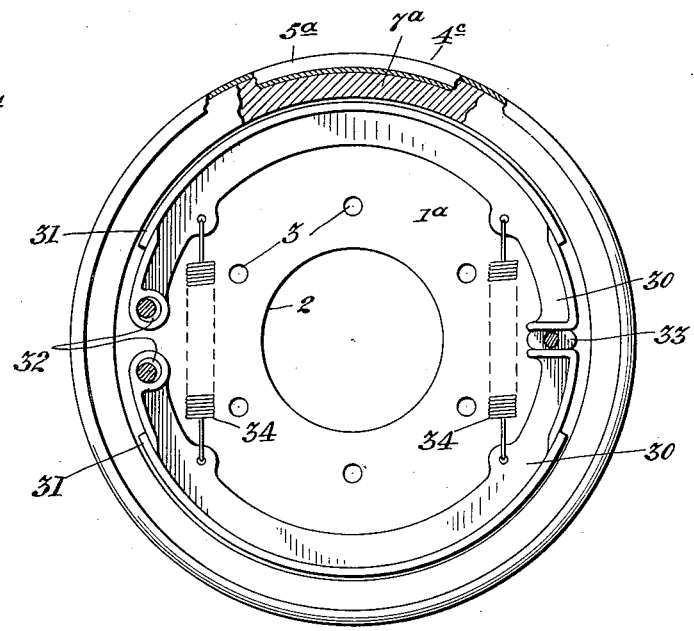
Fig. 2 is an elevation, partly in section, of an internal expanding brake assembly, including the drum illustrated in Fig. 1.

As illustrated in Figs. 1 and 2 of the drawing, the brake drum comprises the body or attaching portion, 1a, which as shown is in the form of an annular flange extending inwardly from the inner edge of the braking flange, providing the central aperture, 2, and if desired provided with a circular series of bolt holes, 3, 3, or other suitable means for attaching the drum to a wheel, hub or other rotary part, or it may be welded or attached in any other manner. 4 represents the braking flange disposed substantially perpendicularly to the attaching portion or body, 1a, and having circularly and helically extending portions bent alternately outwardly and inwardly to form the helical corrugations, 5a. The drum may be conveniently formed by first stamping or pressing it in the usual manner to form the attaching flange or body portion, and the cylindrical braking flange portion. The central hub aperture and the bolt holes may be punched or formed before or after the formation of the braking flange, the hub aperture being coaxial with the flange so that the drum may be centered and rotated by attaching it to a rotary part. The corrugations, 5a, may be formed by means of suitable opposed rollers or the like, and preferably successively from the edge adjacent to the attaching flange or body, 1a, outwardly, to avoid thinning the metal of the braking flange, or the corrugations may be pressed or formed in any other desired way and by any other desired means, as preferred. The helical corrugations, 5a, will impart great strength and rigidity to the flange without materially increasing the weight of the drum or the thickness of the metal from which it is formed, so that it will be able to resist all braking pressures as well as the heat of friction to which it may be subjected without appreciable distortion. The inner face of the helically corrugated braking flange is provided as shown with a brake lining, 7a, having its outer surface provided with helical corrugations, 8a, fitting and in interlocking engagement with the corresponding helical corrugations, 5a, of the drum flange, the said lining having its inner edge engaging the attaching flange or body portion of the drum. The helical corrugations of the braking flange and lining are so arranged that any tendency to relative rotary movement of the lining within the braking flange due to the frictional engagement of the brake shoes will tend to screw the lining in a direction toward the attaching flange or body, 1a, of the drum, and thus tend to prevent such relative movement. The inner face, 9a, of the lining is cylindrical and coaxial with the axis of rotation of the drum, and provides the friction surface of the drum, which is engaged by the opposed friction elements. The lining, 7a, is preferably formed separately from the drum as an integral annular lining, and may therefore be screwed into place by interengaging the helical corrugations of the lining and flange, and rotating one of said parts with respect to the other.

It is to be understood that the lining is permanently held in place with respect to the helically corrugated braking flange. It will be noted that when the lining and braking flange are subjected to braking pressure from the opposed braking element, this pressure is exerted under normal conditions upon the lining in a direction toward the braking flange, so as to more firmly unite the interlocking helical corrugations of the flange and lining and assist in preventing the possibility of any relative rotary movement between the lining and the braking flange. Such relative movement will be positively prevented in one direction by the pitch of the helical corrugations. Should it be deemed necessary to protect the lining against movement in the other direction, any usual means may be employed for preventing the relative rotary movement of these parts, as for example, bolts or rivets extending through the lining and flange. The interengagement of the helical corrugations will prevent any lateral relative movement of the parts. The brake lining may be formed of any suitable material, the particular composition of the lining forming no part of my present invention.

In Fig. 2 I have illustrated a complete brake assembly comprising the brake drum and lining shown in Fig. 1, and previously described, in combination with the other elements of an internal expanding brake mechanism. 30, 30 represent the usual expanding brake shoe, which may be of any desired construction and are provided with smooth friction surfaces, 31, to engage the inner friction surface of the lining, 7a, of the helically corrugated braking flange. The friction surfaces of the shoes are preferably of metal and may be of any desired degree of hardness. The said friction surfaces may be integral with the shoes or they may be in the form of linings of metal or other suitable material, secured to the shoes in any preferred or usual manner. In this instance each of the shoes is shown pivotally mounted on one end upon an eccentric pivot, 32, rigidly but adjustably secured to a supporting plate (not shown) adapted to be bolted to a non-rotatable member in a well known manner, and the opposite ends of said shoes engage the usual expanding cam, 33, the said shoes being normally held in retracted position by springs, 34. The particular mounting and means for expanding the brake shoes form no part of my present invention. Where the friction surface of the shoes is entirely of metal, they may be made of as hard material as desired, so that the surfaces of the shoes which may be the only metallic parts exposed to friction when the brake is applied, will not be subjected to material scoring or cutting, such as is the case where the metallic friction surface is on the drum, which must necessarily be of soft metal to permit it to be formed by stamping or pressing as before described.

It is to be understood that the braking element, which is worn away by friction in use may be either the lining of the drum or the brake shoes, or both as preferred. If the lining is to receive the greater wear, the drum may be relined when necessary. If, on the other hand, the brake shoes are constructed so as to wear more rapidly than the brake lining, the shoes will be replaced or provided with new friction surfaces when sufficiently worn.

It will also be noted that the heat of friction in a brake assembly of the kind shown in Fig. 2 will be partially absorbed by and dissipated from the body of metal in the brake shoes, while such heat as may be transmitted through the brake lining to the helically corrugated braking flange will have no appreciable effect in distorting either the braking flange or the friction surface of the brake lining within the same, so that the area of the surface contact between the braking elements is not affected by the heat of friction, and the efficiency of the brake remains constant under all conditions. Furthermore, the increased strength of the helically corrugated braking flange of the drum prevents any appreciable distortion or change of form of the flange due to braking pressure applied thereto, and the helical corrugations increase the heat radiating surface area of the flange.

It will also be understood that any variations or inaccuracies in the drum flanges can be compensated for by the lining, the inner face of which can always be brought into true cylindrical form coaxial with the axis of rotation of the drum. The lining may actually vary in thickness in different parts to enable it to conform to the irregularities of surface or form of the flange while the friction face will be truly coaxial with the axis of rotation of the drum.

While I prefer to form the lining separately and screw it into place by interengaging the helical corrugations of the lining and braking flange, the lining could be formed in suitable lengths corresponding with the internal periphery of the drum flange and secured thereto, or it may be molded and completely formed in situ in proper relation to the drum and provided with an inner friction surface coaxial with the axis of rotation of the drum and hardened in position therein if desired, in accordance with my improved process covered by my separate application filed on or about January 10th, 1931 and given Serial Number 507,905.

What I claim and desire to secure by Letters Patent is:

1. A pressed sheet metal brake drum comprising an annular body portion provided with means for attaching it to a rotary part, and an integral annular braking flange disposed substantially perpendicularly to said body portion and of substantially uniform thickness throughout said flange, and having corrugations formed therein correspondingly affecting the inner and outer faces of the flange and extending helically around the flange in lines substantially coaxial with respect to the axis of the drum for stiffening said flange to resist distortion due to brake pressure and heat of friction.

2. A pressed sheet metal brake drum comprising an annular body portion provided with means for attaching it to a rotary part, and an integral annular braking flange disposed substantially perpendicularly to said body portion and of substantially uniform thickness throughout said flange, and having corrugations formed therein and extending helically around the flange in lines substantially coaxial with respect to the axis of the drum for stiffening said flange to resist distortion due to brake pressure and heat of friction, and a lining engaging the inner face of said braking flange and provided on its outer face with helical corrugations fitting the helical corrugations of the inner face of said braking flange, and provided with an inner cylindrical friction surface coaxial with the axis of rotation of said drum.

3. A pressed sheet metal brake drum comprising an annular body portion provided with means for attaching it to a rotary part, and an integral annular braking flange disposed substantially perpendicularly to said body portion and of substantially uniform thickness throughout said flange, and having corrugations formed therein and extending helically around the flange in lines substantially coaxial with respect to the axis of the drum for stiffening said flange to resist distortion due to brake pressure and heat of friction, and an integral annular friction lining formed separately from the drum and provided on its outer surface with helical corrugations to fit and engage the helical corrugations on the inner face of said braking flange, to permit said lining to be screwed into operative position with respect to the drum.

CALEB S. BRAGG.